(12) United States Patent
Cognolato et al.

(10) Patent No.: US 8,567,218 B2
(45) Date of Patent: Oct. 29, 2013

(54) BURNER FOR CHEMICAL VAPOUR DEPOSITION OF GLASS

(75) Inventors: Carlo Cognolato, Milan (IT); Francesco Mole', Monza (IT); Andrea Demergazzi, Milan (IT); Franco Veronelli, Lainate (IT)

(73) Assignee: Prysmian Cavi e Sistemi Energia S.r.l., Milan (IT)

( * ) Notice: Subject to any disclaimer, the term of this patent is extended or adjusted under 35 U.S.C. 154(b) by 1433 days.

(21) Appl. No.: 10/538,897

(22) PCT Filed: Dec. 20, 2002

(86) PCT No.: PCT/EP02/14614
§ 371 (c)(1),
(2), (4) Date: Feb. 10, 2006

(87) PCT Pub. No.: WO2004/056714
PCT Pub. Date: Jul. 8, 2004

(65) Prior Publication Data
US 2006/0162389 A1    Jul. 27, 2006

(51) Int. Cl.
*C03B 37/018* (2006.01)

(52) U.S. Cl.
USPC ............................... 65/530; 65/531; 239/601

(58) Field of Classification Search
USPC .................................. 239/601; 65/530, 531
See application file for complete search history.

(56) References Cited

U.S. PATENT DOCUMENTS

| | | | | |
|---|---|---|---|---|
| 2,121,948 A * | 6/1938 | Borland | ......................... | 431/349 |
| 2,775,482 A * | 12/1956 | Schutz | ......................... | 239/398 |
| 3,003,312 A * | 10/1961 | Jewell | ..................... | 239/265.35 |
| 3,565,346 A | 2/1971 | Carrell | | |
| 3,572,591 A * | 3/1971 | Brown | ......................... | 239/337 |
| 4,292,290 A * | 9/1981 | Tunison, III | .................. | 423/336 |
| 4,661,140 A * | 4/1987 | Takimoto et al. | ............... | 65/157 |
| 4,801,322 A * | 1/1989 | Suda et al. | ...................... | 65/144 |
| 5,174,803 A * | 12/1992 | O'Brien, Jr. | .................... | 65/271 |
| 5,922,100 A | 7/1999 | Cain et al. | | |
| 6,363,746 B1 * | 4/2002 | Wei et al. | ........................ | 65/17.4 |
| 6,910,352 B2 * | 6/2005 | Johnson | .......................... | 65/397 |
| 2002/0189298 A1 | 12/2002 | Arima et al. | | |

FOREIGN PATENT DOCUMENTS

| | | |
|---|---|---|
| EP | 0 978 487 A2 | 2/2000 |
| JP | 04-228440 | 8/1992 |
| WO | WO 00/17115 | 3/2000 |

OTHER PUBLICATIONS

Takeda et al., "Core Burner and Production of Core Preform", Patent Abstracts of Japan, JP 10-081534 A, (Mar. 31, 1998).
Danzuka et al., "Production of Glass Article", Patent Abstracts of Japan, JP 04-228440 A, (Aug. 18, 1992).
Nakayama et al., "Burner for Forming Glass Fine Particles", Patent Abstracts of Japan, JP 04-160026 A, (Jun. 3, 1992).

* cited by examiner

*Primary Examiner* — John Hoffmann
(74) *Attorney, Agent, or Firm* — Finnegan, Henderson, Farabow, Garrett & Dunner, L.L.P.

(57) ABSTRACT

A burner for a vapour deposition process has a central nozzle for ejecting a glass precursor material, at least a crown of nozzles surrounding said central nozzle for ejecting a flame reactant, and a circular nozzle between said central nozzle and said crown of nozzles for ejecting an innershield gas, wherein the central nozzle has a concave shape in a cross section in the axial plane and, preferably, a symmetry about an axial plane.

19 Claims, 3 Drawing Sheets

BURNER FOR CHEMICAL VAPOUR DEPOSITION OF GLASS

CROSS REFERENCE TO RELATED APPLICATION

This application is a national phase application based on PCT/EP2002/014614, filed Dec. 20, 2002, the content of which is incorporated herein by reference.

BACKGROUND OF THE INVENTION

1. Field of the Invention

This invention relates to a burner for a chemical vapour deposition process, in particular for a chemical vapour deposition process for the manufacturing of a glass preform suitable for drawing an optical fibre.

2. Description Of The Related Art

Two typical processes for producing a glass preform suitable for drawing an optical fibre are the OVD (Outside Vapor Deposition) and the VAD (Vapor-phase Axial Deposition). In these techniques, a burner is used to generate a flame and to eject one or more substances that react in the flame to form silica soot (and being thereofore called "silica precursors"), which is deposited onto a rotating mandrel.

Conventional burners for manufacturing optical preforms comprise a plurality of co-axial ducts, terminating in corresponding nozzles wherein the gases are ejected. During the process, the burner is fed with a silica precursor (such as $SiCl_4$, optionally together with dopants materials, such as $GeCl_4$), combusting gases (e.g. oxygen and hydrogen or methane) and, optionally, some inert gas (e.g. nitrogen, argon or helium). Typically, the glass precursor material is fed through the central duct. The combustible gases comprise a combustible gas containing hydrogen and an auxiliary gas, typically oxygen, that aids the combustible gas to generate a flame. In the gas stream so composed, $H_2O$ is produced as a result of the combustion reaction.

When the silica precursor is $SiCl_4$, silica synthesis is achieved through two different physical-chemical processes: a main process of diffusive hydrolysis between the precursor and the combustion product ($H_2O$) by the reaction $SiCl_4 + 2H_2O \rightarrow SiO_2 + 4HCl$, and a secondary process of premixed oxidation, active at very high temperatures (usually greater than 1000° C.), by the reaction $SiCl_4 + O_2 \rightarrow SiO_2 + 2Cl_2$. An alternative silica precursor is OMCTS (octamethylcyclotetrasiloxane) and premixed oxidation is in this case the only process involved in silica synthesis.

The Applicant has identified, by experimental tests and numeric simulations, two physical phenomena that may limit the complete transformation of the precursor and, as a result, the process yield: penetration of $H_2O$ into the $SiCl_4$ stream (or of $O_2$ into the OMTCS stream), and heat penetration into the stream of precursor and forming soot. Reduced heat penetration results, in particular, in a reduced particle heating and in a reduced thermophoretic effect.

The presence of these two phenomena is particularly problematic when a high deposition rate is required. In fact, although an easy way of increasing the reactant flow rate without excessively increasing the exit speed thereof would be to increase the reactant nozzle cross-section (and, accordingly, the burner dimensions), the intense flows produced by such a burner would thwart the above described phenomena, leading to low-efficient processes.

Two burners of a conventional type are described in U.S. Pat. No. 3,565,346 and U.S. Pat. No. 5,922,100.

U.S. Pat. No. 3,565,346 describes a burner having a central circular nozzle for the vaporized silicon tetrachloride, an annular sheath opening surrounding the central nozzle for the exit of an oxygen-containing gas, and a plurality of apertures symmetrically disposed around the annular sheath in a cylindrical configuration, for ejecting a combustible gas.

U.S. Pat. No. 5,922,100 discloses a burner having a central circular nozzle for $OMCTS+O_2$, an annular opening surrounding the central nozzle for ejecting $N_2$, two rings of orifices around the annular opening for ejecting $O_2$, and an outer ring of orifices for ejecting $CH_4+O_2$.

It has been observed that these two type of burner can provide good performances only with relatively low reactant flow rates.

JP04-228440 proposes a high-yield multi-flame burner, having the precursor ejecting port of elliptic or rectangular shape, able to improve the deposition yield up to 65% with respect to burners having the precursor ejecting port of circular shape.

SUMMARY OF THE INVENTION

The Applicant has tackled the problem of providing a burner able to improve the above described phenomena of penetration of $H_2O$ into the $SiCl_4$ stream (or of $O_2$ into the OMTCS stream) and heat penetration into the stream of precursor and forming soot, so as to increase the process yield.

The Applicant has found that, by providing a precursor exit port of "concave" cross section, the contact surface between the precursor and the reactant allowing its transformation into glass soot is increased; as a result, both said phenomena are improved and the process yield is increased.

For the purposes of the present invention, with "concave" shape it is intended any planar geometrical shape that is not "convex", wherein a planar geometrical shape is "convex" if it contains all the line segments connecting any pair of its points. Thus, for example, a star is a concave shape, while a circle and a rectangle are convex shapes.

The reactant is preferably $H_2O$ when the precursor is $SiCl_4$, and $O_2$ when the precursor is OMCTS.

This invention therefore relates to a burner for a vapour deposition process having a central nozzle for ejecting a glass precursor material, wherein the central nozzle has a concave shape.

Preferably, the central nozzle has symmetry about an axial plane.

The burner preferably comprises at least a crown of nozzles surrounding said central nozzle, for ejecting a flame reactant. The burner also preferably comprises a circular nozzle between said central nozzle and said crown of nozzles for ejecting an innershield gas.

The central nozzle may advantageously have first angular sectors of minimum radial dimensions and second angular sectors of maximum radial dimensions.

The at least a crown of nozzles may comprise a first set of nozzles in the same angular positions of said second angular sectors and a second set of nozzles in the same angular positions of said first angular sectors.

Moreover, the burner preferably comprises a first set of orifices exiting in said first set of nozzles and a second set of orifices exiting in said second set of nozzles, the orifices of the first set being inclined of a first angle with respect to a central axis of said burner and the orifices of the second set being inclined of a second angle with respect to said central axis, said second angle being greater than said first angle.

Preferably, the burner has a central duct exiting in said central nozzle for the passage of said glass precursor material, and comprises a central member positioned inside the central duct for forcing the glass precursor material toward the external boundary of said central nozzle.

The central member may have at least an enlarged portion that substantially fits with external walls of said central duct.

In a second aspect thereof, the present invention relates to a chemical vapor deposition process, comprising ejecting a stream of glass precursor material having a concave cross section.

Advantageously, the process may further comprise producing a flame around said stream of glass precursor material and ejecting an innershield gas between said stream of glass precursor material and said flame.

Preferably, the stream of glass precursor material has a central axis, said cross-section has first angular zones of maximum radial extension alternated to second angular zones of minimum radial extension, and the step of producing a flame comprises ejecting combustible gases along a first direction with respect to said axis at first angular positions corresponding to said first angular zones and along a second direction with respect to said axis at second angular positions corresponding to said second angular zones, said second angle being greater than said first angle.

Advantageously, the stream of glass precursor material may have its maximum velocity in an annular region around a central axis.

BRIEF DESCRIPTION OF THE DRAWINGS

Further details may be found in the following description, which refers to the appended figures listed here.

DETAILED DESCRIPTION OF THE INVENTION

Figure 1:
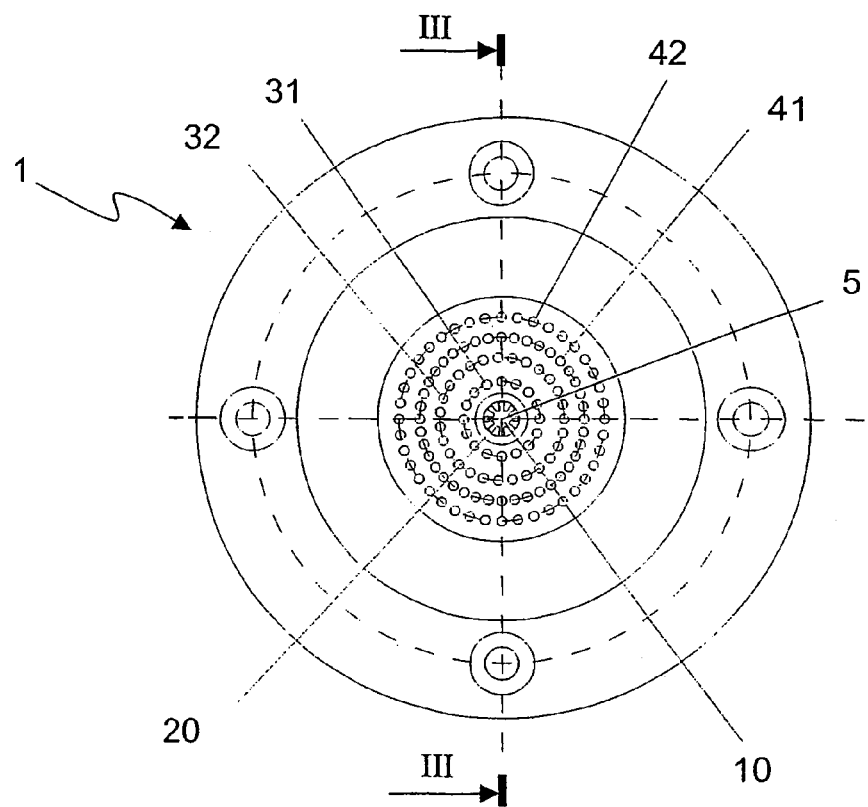
FIG. 1 shows the face of a burner according to the present invention.

FIG. 1 illustrates the face of a burner 1 according to the present invention, particularly suitable for an OVD process. Burner 1 is apt to eject a stream of glass precursor material (briefly referred to as "precursor" in the following), and to generate a flame for uniformly heating said stream, thus causing the precursor to react. As a result, a stream of fine soot glass particles is formed. The soot particles can be deposited onto a rotating rod to form a glass preform, as well known in the art.

Burner 1 has, on its front face, a central nozzle 10, an annular nozzle 20 surrounding the central nozzle 10, and four concentric crowns of nozzles 31, 32, 41, 42 surrounding the circular nozzle 20. A central axis of the burner 1 is indicated with 5.

Burner 1 may for example eject the following gases:
Central nozzle 10: $SiCl_4 + O_2$ (precursor);
Circular nozzle 20: $O_2$ (innershield);
Inner couple of nozzle crowns 31, 32: $CH_4 + O_2$ (flame);
Outer couple of nozzle crowns 41, 42: $O_2$ (outershield).

According to the present invention, the central nozzle 10 has a "concave" shape (as previously defined), for example as the one illustrated in FIG. 1.

Figure 2:
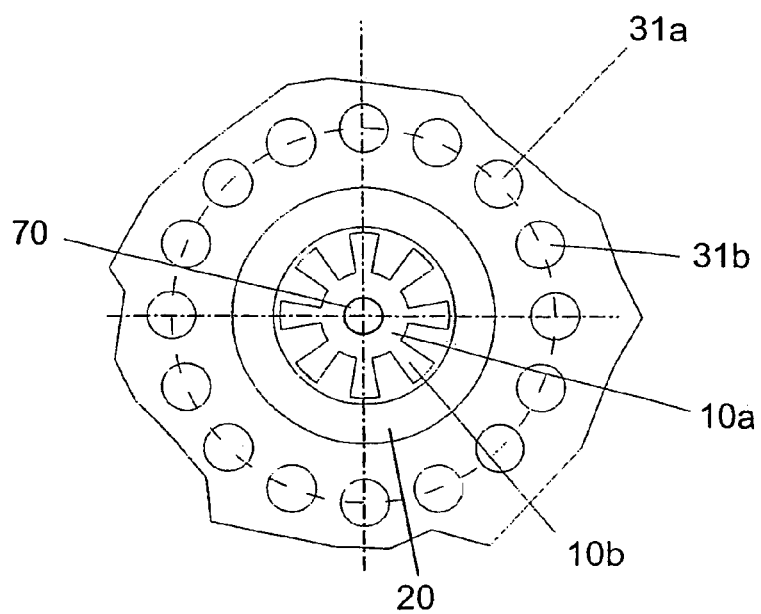
FIG. 2 is an enlarged view of the central part of the face of the burner of FIG. 1.

With reference to FIG. 2, the central nozzle 10 preferably has a circular central region 10a and a plurality of radial regions 10b extending from the central region 10a. The radial regions 10b are preferably evenly-spaced and may be in even or odd number (eight in the present case). The central nozzle 10 is preferably symmetric with respect to an axial plane, i.e. to a plane containing axis 5 (such as plane III-III in FIG. 1), such as in a five-points star shape, and possibly symmetric with respect to axis 5, such as in a six-points star shape.

In the particular embodiment here illustrated, each radial region 10b is delimited by two lateral walls converging towards axis 5 (in particular, laying on respective radial planes) and by an end wall laying on a same circumference as the end walls of the other radial regions, close to the internal boundary of annular nozzle 20.

The particular shape of FIG. 2 allows increasing the external perimeter of the precursor stream of more than 160% with respect to a nozzle having a same cross-sectional area but circular shape. As a result, the area of the precursor stream exposed to the flame is increased and the Reynolds number (defined in the following) and the stream turbulence are decreased.

The radial regions may have different shapes from that illustrated in FIG. 2, for example may be triangular, such as in a star-like shape.

Burner 1 may also advantageously comprise a central pin 70, whose scope is to regulate the gas distribution in the central nozzle 10, as later described.

Figure 3:
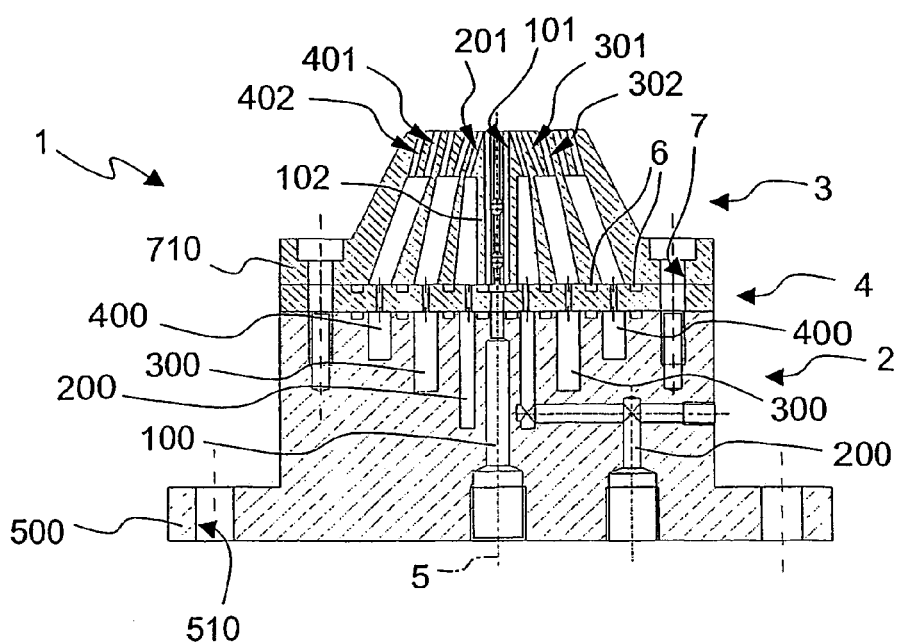
FIGS. 3 is a longitudinal cross-section of the burner of the present invention according to line III-III of FIG. 1.
Figure 4:
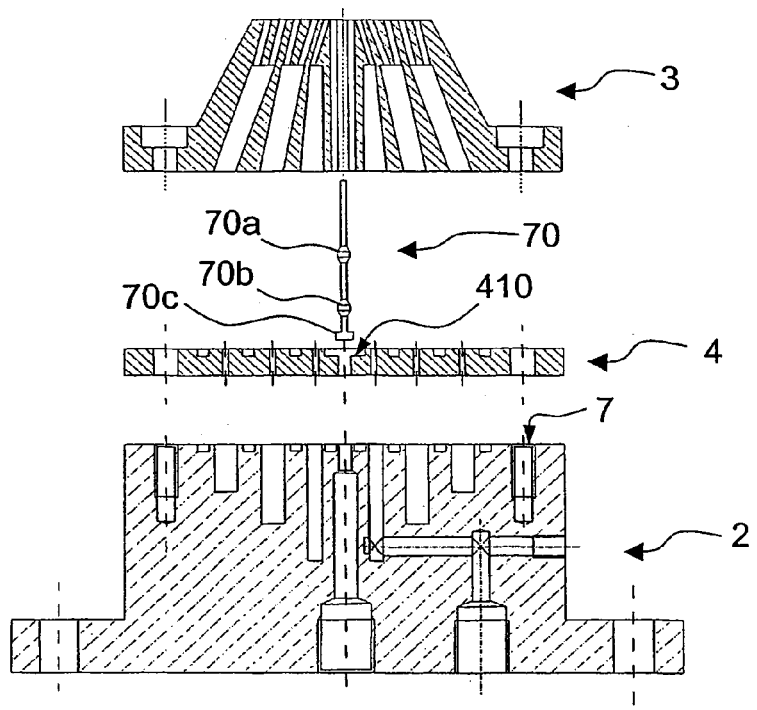
FIG. 4 is an exploded view of the burner of the present invention, cross-sectioned as in FIG. 3.

With reference to FIGS. 3 and 4, burner 1 preferably comprises a back block 2, a face block 3, and a manifold plate (or intermediate block) 4 interposed between back block 2 and face block 3. These three pieces are preferably made of metal (for example Aluminum) and are releasably coupled to each other, for example by bolts (not shown). Back block 2 is a gas-receiving block connected to a reactants feed system (not shown) for receiving the required gases. Face block 3 defines a gas-ejecting block and has the plurality of exit nozzles previously described.

Preferably, blocks 2, 3 and 4 have a substantially circular cross-section and are substantially coaxial to axis 5. Moreover, blocks 2, 3 and 4 are preferably made of metal, more preferably of aluminium, which can be readily machined; however, other metals suitable to be machined, like stainless steel (e.g., 303 stainless steel), can alternatively be used.

For each block, back and front portions will be identified coherently with the above definition of back block and face block.

Burner 1 defines internally a plurality of gas passages extending from the back block 2 to the nozzles of the face block 3. In particular, burner 1 has four passages 100-400 suitable to convey respective flows of gas. Inside the back block 2 and the manifold plate 4, the first passage 100 is a central rectilinear and cylindrical duct coaxial to axis 5, while inside the face block 3 it is defined by a duct 101 having a cross-section shaped as nozzle 10. Duct 101 is delimited by the internal surface of a central wall 102, whose external surface internally delimits passage 201. The internal surface of wall 102 is grooved so as to show said particular cross-section.

In FIGS. 3 and 4, only the first part of passages 100 and 200 is illustrated, the first part of passages 300 and 400 being in angular positions not crossed by plane III-III of FIG. 1, but being similar to that of passage 200.

The entrance hole of passages 100-400 is enlarged and threatened to allow coupling of the pipes fittings of the reactants feed system to the back block 2.

Back block 2 is preferably an integrally-formed body of substantially cylindrical shape, having at its base a radial flange 500 for coupling onto a burner mounting block (not shown). For this purpose, radial flange 500 has unthreaded holes 510 for passage of coupling bolts (not shown).

Manifold plate 4 is preferably a disk-like body with the same external diameter of back block 2, having the function of stabilizing the gas pressure and providing uniform gas flows at face block 102. To this aim, passages 100-400 have a minimum, predetermined, dimension inside manifold plate 4, so as to regulate the gas pressure flowing therein. Inside manifold 4, the passages 200-400 are defined by respective crown of orifices, coaxial to axis 5.

Both back block 2 and manifold plate 4 may have, on the respective front surfaces, annular grooves 6 suitable to house respective O-rings, used to prevent gas leakage among the different passages of burner I or towards the external of burner 1.

Preferably, face block 3 has a frusto-conical shape and comprises, at its base, a circular flange 710 having substantially the same external diameter of manifold plate 4 and back block 2.

Burner 1 is provided with holes 7, passing through circular flange 710 of face block, the external part of manifold plate 4 and the front and external portion of back block 2 (wherein they are threatened), to allow coupling of the three pieces by bolts.

In their first part inside face block 3, passages 200, 300 and 400 are annular ducts converging towards axis 5. Then, while passage 200 continues as a circular duct 201 around central passage 100 and terminates in the circular nozzle 20, passages 300 and 400 split each in two crowns of orifices 301, 302 and 401, 402, which terminate in the first couple of nozzle crowns 31, 32 and in the second couple of nozzle crowns 41, 42, respectively.

Preferably, the orifices of the inner crown, i.e. those indicated with 301 and terminating in the nozzles 31, are in a number that is twice the number of the radial regions 10b of the central nozzle 10. Moreover, orifices 301 are so angularly arranged that, as shown in FIG. 2, half of nozzles 31, indicated with 31a, are aligned with the radial regions 10b and the other half of nozzles 31, indicated with 31b, are interposed between two radial regions 10b.

Advantageously, the slope of orifices 301 depends on the position of the corresponding nozzles with respect to the radial regions 10b. In particular, those orifices 301 terminating in a nozzle 31b, have a slope with respect to the central axis 5 greater than the orifices 301 terminating in a nozzle 31a so as to have a higher penetration power of the flame gas (such as $CH_4+O_2$) into the precursor gas stream. The angles formed by the orifices 301 with axis 5 will be selected according to the shape of the central nozzle 10. Therefore, a first set of orifices 301, terminating in nozzles 31a, will extend along directions forming a first angle with axis 5 and a second set of orifices 301, terminating in nozzles 31b, will extend along directions forming a second angle with axis 5. The first angle is preferably comprised between 13° and 19° and the second angle is preferably comprised between 17° and 23°.

As shown in FIG. 4, the central pin 70 is a straight rod-like member with two enlarged portions 70a, 70b, having substantially the same diameter of the central region 10a of the central nozzle 10. The enlarged portions 70a, 70b substantially fit with the external walls of the central region 10a and their function is that of maintain the pin 70 in a centered position. The enlarged portions also contribute in forcing the precursor to flow into the radial regions 10b.

Figure 5A:
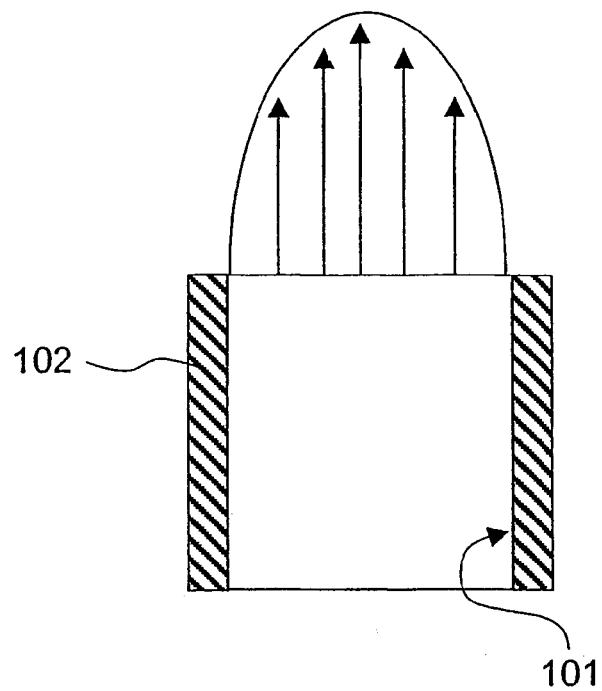
FIGS. 5a and 5b show the precursor stream speed profile, in the absence and in the presence of a central pin acting as a flow control member, respectively.
Figure 5B:
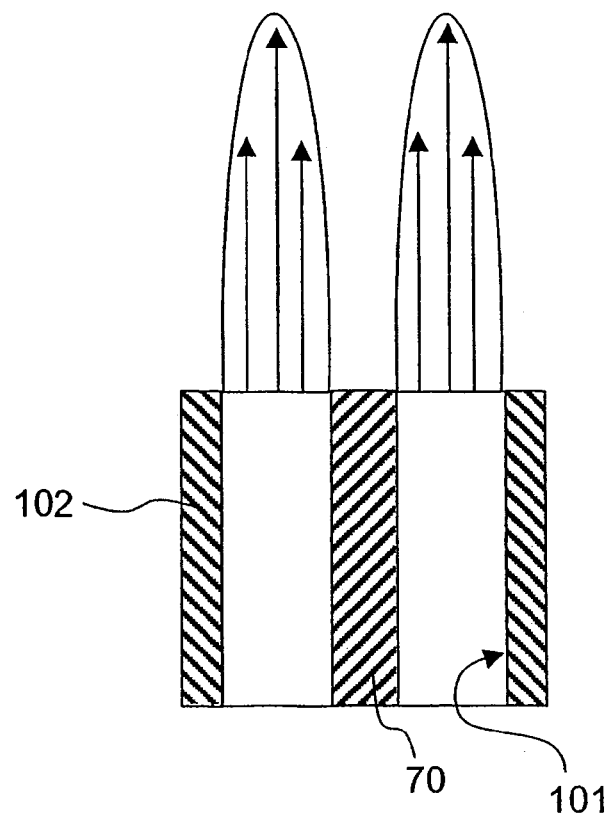

Pin 70 is also provided, at its back end, of a plurality of radial extensions 70c, shaped so as to allow passage of the gas in the interstices thereof. For example, the back end of pin 70 may comprise three extensions forming a triangle with concave sides. The back end of pin 70 is positioned, when the burner is assembled, against a edge 410 on the manifold plate 4. The central pin 70 has the scope of forcing the precursor to correctly distribute on the external portion of the central nozzle 10, thus causing a decrease of turbulence and of the thickness of precursor stream to be penetrated by $H_2O$, $O_2$ or other reactant. FIGS. 5a and 5b show, respectively, the precursor stream velocity profile at the exit of the burner in the absence and in the presence of pin 70. It can be appreciated that in the presence of the pin 70 the stream is annular and the velocity is higher.

The concave shape of the central nozzle 10 provides, with respect to the traditional convex shape, an increase of the precursor stream surface exposed to flame gases. This results in a series of effects that improve the deposition rate.

A first effect is an increase of the amount of precursor transformed into glass soot particles, through a better diffusion inside the precursor stream of the reactant responsible of its synthesis ($H_2O$, $O_2$, etc).

A second effect is the increase of the penetration inside the precursor stream of the heat generated by the flame. The temperature increase in the precursor reaction zone provides several benefits. Firstly, the kinetic of the silica synthesis reaction is more rapid, since the reaction kinetic constants increase with a temperature increase. Moreover, a higher-temperature of the soot particles is achieved, that results in a higher coalescence due to improved particle fluidity, and in an improved thermophoretic effect due to a higher thermal gradient between the particle stream and the preform. A higher deposition rate is thus achieved.

A third effect is a lower consumption of both flame gases and glass precursor, due to the higher reaction efficiency.

The particular shape of the central nozzle 10 provides a further advantage: a reduction of the stream turbulence. If the stream turbulence is too high, the gas layer adhering to the preform surface and flowing thereon with laminar motion, known as "boundary layer", would tend to detach soon from the preform resulting in a reduction of the contact surface between the soot particles stream and the preform itself. This, of course, causes a reduction of the process efficiency, and a control of the stream turbulence is therefore very important.

The turbulence of the precursor stream is related to the Reynolds Number, defined as:

$$Re = \frac{\rho \cdot v \cdot D_H}{\mu}$$

where $\rho$ is the fluid density, $v$ the fluid speed, $D_H$ the hydraulic diameter defined as 4·(stream section area/stream section perimeter), and $\mu$ the fluid viscosity.

The concave shape of the central nozzle 10 provides low values of the area/perimeter ratio and, therefore, low values of the Reynolds Number. It can be verified that burner 1 has a Reynolds Number that is about 66% lower than that of a similar burner having a circular central nozzle.

A low value of the Reynolds Number results in high deposition efficiency, since the stream has a low turbulence and the boundary layer of the flame around the preform has a wide extension.

It will be apparent to those skilled in the art that various modifications and variations can be made to the disclosed embodiment of the present invention without departing from the scope or spirit of the invention.

For example, it can be appreciated that the geometry of second, third and fourth passages 200, 300 and 400 is not basic, and that burner 1 may be made with different geometries and number of passages around the central passage 100.

EXAMPLE

The Applicant has compared the performances of a burner according to the present invention, in particular a burner as in FIGS. 1-4, with those of a similar burner having a circular central nozzle.

Tables I and II report the characteristics of the two burners, indicated as INV. BURNER (burner of the invention) and COMP. BURNER (comparative burner). The following symbols are used:

$\varnothing_I$=inner diameter;
$\varnothing_O$=outer diameter;
$\varnothing_{orif}$=diameter of orifices;
$N_{IC}$=number of orifices in inner crown;
$N_{OC}$=number of orifices in outer crown;
$\alpha$: slope of orifices with respect to axis 5; $\alpha_{IN}$: slope of orifices of inner crown; $\alpha_{OUT}$: slope of orifices of outer crown;
$A_{10}$: cross-section of nozzle 10; $A_{70}$: cross-section of pin 70.

TABLE I

| COMP. BURNER | | | | | |
|---|---|---|---|---|---|
| Precursor (nozzle 10) | $A_{10}$ = 7.5 mm$^2$ | | | | |
| Innershield (nozzle 20) | $\varnothing_I$ = 3.7 mm | $\varnothing_O$ = 6.5 mm | A = 22.4 mm$^2$ | $\alpha$ = 13° | |
| Flame (nozzles 31, 32) | $\varnothing_{orif}$ = 1.2 mm | $N_{IC}$ = 20 | $N_{OC}$ = 27 | A = 53.2 mm$^2$ | $\alpha$ = 13° |
| Outershield (nozzles 41, 42) | $\varnothing_{orif}$ = 1.2 mm | $N_{IC}$ = 40 | $N_{OC}$ = 40 | A = 90.5 mm$^2$ | $\alpha$ = 13° |

TABLE II

| INV. BURNER | | | | | |
|---|---|---|---|---|---|
| Precursor (nozzle 10) | $A_{10}$ = 8.1 mm$^2$ | $A_{70}$ = 0.785 mm$^2$ | | | |
| Innershield (nozzle 20) | $\varnothing_I$ = 4.5 mm | $\varnothing_O$ = 6.5 mm | A = 17.3 mm$^2$ | $\alpha$ = 16° | |
| Flame (nozzles 31, 42) | $\varnothing_{orif}$ = 1.2 mm | $N_{IC}$ = 16 | $N_{OC}$ = 27 | A = 48.6 mm$^2$ | $\alpha_{IN}$ = 16°-20° $\alpha_{OUT}$ = 13° |
| Outershield (nozzles 41, 42) | $\varnothing_{orif}$ = 1.2 mm | $N_{IC}$ = 40 | $N_{OC}$ = 40 | A = 90.5 mm$^2$ | $\alpha$ = 13° |

The gas flow rates fed to the burners are reported in Table III

TABLE III

| | Precursor | | Innershield | Flame | | Outershield |
|---|---|---|---|---|---|---|
| | SiCl$_4$ (g/min) | O$_2$ (slpm) | O$_2$ (slpm) | CH$_4$ (slpm) | O$_2$ (slpm) | O$_2$ (slpm) |
| COMP | 45 | 6.5 | 2.0 | 28.0 | 28.0 | 10.0 |
| INV | 45 | 6.5 | 2.2 | 28.0 | 28.0 | 10.0 |

Table IV reports the results of the experiment.

TABLE IV

| | Deposition rate (g/min) | Efficiency (%) | Density (g/cc) |
|---|---|---|---|
| COMP | 7.6 | 48 | 0.52 |
| INV | 8.1 | 51 | 0.55 |

The deposition rate and the efficiency have been calculated according to the following relations:

$$\text{Dep\_rate} = \frac{\text{soot\_weight}}{\text{process\_time}}$$

$$\text{Eff \%} = \frac{\text{soot\_weight}}{\text{process\_time} \cdot Q_{prec} \cdot v \cdot \frac{PM_{ox}}{PM_{prec}}} \cdot 100$$

where:
$Q_{prec}$=precursor (SiCl4, OMTCS, etc.) flow rate (g/min);
$PM_{prec}$=molecular weight of the precursor;
$PM_{ox}$=molecular weight of the produced oxide (SiO$_2$, GeO$_2$, etc.);
$v$=oxide and precursor stoichiometric coefficients ratio.

The higher density of the deposited soot results from a higher temperature of the SiO$_2$ particles deposited on the preform. It can be appreciated that both the deposition rate and the process efficiency are improved by the use of the burner of the present invention.

The invention claimed is:
1. A burner for a vapour deposition process, comprising:
a front face;
a precursor exit port defined in said front face for ejecting a glass precursor material, the precursor exit port having a center centrally-located on said front face, said precursor exit port having a concave shape at said front face comprising a circular central region and a plurality of radial regions extending from the central region and each radial region is defined by a pair of walls converging toward the axis and an end wall, respectively; and an annular orifice defined in said front face for ejecting a gas, said annular orifice surrounding said central orifice.

2. The burner according to claim 1, wherein said precursor exit port has a symmetry about an axial plane.

3. The burner according to claim 1, further comprising a ring of nozzles, each nozzle in the ring of nozzles being defined by a respective surface, the ring of nozzles surrounding said precursor exit port for ejecting a flame reactant.

4. The burner according to claim 3, wherein the annular orifice is located between said precursor exit port and said ring of nozzles.

5. The burner according to claim 4, wherein said precursor exit port has first angular sectors of minimum radial dimensions and second angular sectors of maximum radial dimensions.

6. The burner according to claim 5, wherein said ring of nozzles comprises a first set of nozzles in the same angular positions of said second angular sectors and a second set of nozzles in the same angular positions of said first angular sectors.

7. The burner according to claim 6, further comprising a first set of ducts terminating in said first set of nozzles and a second set of ducts terminating in said second set of nozzles, the ducts of the first set being inclined at a first angle with respect to a central axis of said burner and the ducts of the second set being inclined at a second angle with respect to said central axis, said second angle being greater than said first angle.

8. The burner according to claim 1, having a central duct terminating in said percursor exit port for the passage of said glass precursor material, and comprising a central member positioned inside the central duct for forcing the glass precursor material toward an external boundary of said central orifice.

9. The burner according to claim 8, wherein the central member has at least an enlarged portion that substantially fits with external walls of said central duct.

10. The burner according to claim 1, wherein the plurality of radial regions extending from the central region of the precursor exit port are evenly-spaced with respect to one another.

11. The burner according to claim 1, wherein the plurality of radial regions extending from the central region of the precursor exit port are triangular in shape.

12. A burner for a vapour deposition process, comprising:
a face block having a front face;
a central duct for the passage of a glass precursor material, the central duct exiting in a precursor exit port on said front surface;
a circular duct for the passage of a gas reactant, said circular duct extends around said central duct and terminates in a circular reactant exit port on said front surface;
wherein said precursor exit port has a concave shape at said front face increasing contact surface between the precursor and the reactant, said concave shape comprising a circular central region and a plurality of radial regions extending from the central region and each radial region is defined by a pair of walls converging toward the axis and an end wall, respectively.

13. The burner according to claim 12, wherein the radial regions are evenly-spaced around the circular central region so as to define non-contiguous radial regions.

14. The burner according to claim 12, wherein the end wall of each radial region lays on a same circumference as the end walls of the other radial regions.

15. The burner according to claim 12, wherein the end walls of the radial regions lays close to the internal boundary of the circular reactant exit port.

16. The burner according to claim 12, wherein the radial regions have a triangular shape.

17. The burner according to claim 12, further comprising a first passage and a second passage terminating each in two rings of orifices.

18. The burner according to claim 17, wherein the circular reactant exit port is located between said precursor exit port and said rings of orifices.

19. The burner according to claim 17, wherein the orifices of the inner ring of orifices are in a number that is twice the number of the radial regions of the circular reactant exit port.

* * * * *

UNITED STATES PATENT AND TRADEMARK OFFICE
CERTIFICATE OF CORRECTION

Page 1 of 1

PATENT NO.       : 8,567,218 B2
APPLICATION NO.  : 10/538897
DATED            : October 29, 2013
INVENTOR(S)      : Cognolato et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1791 days.

Signed and Sealed this
Twenty-first Day of July, 2015

Michelle K. Lee
*Director of the United States Patent and Trademark Office*